(12) United States Patent  (10) Patent No.: US 9,131,226 B2
Suzuki  (45) Date of Patent: Sep. 8, 2015

(54) DISPLAY DEVICE AND CONTROL METHOD FOR THE DISPLAY DEVICE

(71) Applicant: SEIKO EPSON CORPORATION, Tokyo (JP)

(72) Inventor: Naoki Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 120 days.

(21) Appl. No.: 13/874,916

(22) Filed: May 1, 2013

(65) Prior Publication Data

US 2013/0321597 A1  Dec. 5, 2013

(30) Foreign Application Priority Data

May 30, 2012 (JP) ................................ 2012-122798

(51) Int. Cl.
  *H04N 13/04* (2006.01)
  *H04N 13/00* (2006.01)
(52) U.S. Cl.
  CPC ............. *H04N 13/04* (2013.01); *H04N 13/004* (2013.01); *H04N 13/007* (2013.01)
(58) Field of Classification Search
  CPC .......... H04N 13/007; H04N 2213/008; H04N 13/004; H04N 13/04; G02B 27/2264
  USPC .......................................................... 348/54
  See application file for complete search history.

(56) References Cited

U.S. PATENT DOCUMENTS

| 2002/0118299 A1* | 8/2002 | Kahn ............................ 348/569 |
| 2010/0045780 A1* | 2/2010 | Kwon et al. ..................... 348/51 |
| 2011/0050850 A1* | 3/2011 | Yamada .......................... 348/43 |
| 2012/0229599 A1* | 9/2012 | Fukuyama ....................... 348/42 |

FOREIGN PATENT DOCUMENTS

| JP | A-5-304685 | 11/1993 | |
| JP | A-7-284128 | 10/1995 | |
| JP | A-2008-216460 | 9/2008 | |
| WO | WO2011064913 | * 6/2011 | ............. H04N 13/04 |

* cited by examiner

*Primary Examiner* — Mohammed Rahaman
(74) *Attorney, Agent, or Firm* — Oliff PLC

(57) ABSTRACT

A projector displays, together with an input image, an OSD image different from the input image. The projector includes an image output unit configured to output image data of an image for the left eye and image data of an image for the right eye, an image processing unit configured to read out a different image data from a RAM, apply, to the image data of the image for the left eye, processing for arranging the different image data in a position for the left eye and combining the different image data with the image data of the image for the left eye, and apply, to the image data of the image for the right eye, processing for arranging the different image data in a position for the right eye and combining the different image data with the image data of the image for the right eye.

5 Claims, 8 Drawing Sheets

DISPLAY DEVICE AND CONTROL METHOD FOR THE DISPLAY DEVICE

BACKGROUND

1. Technical Field

The present invention relates to a display device that displays an image and a control method for the display device.

2. Related Art

As a display device that displays an input image, there has been known a display device having a function of superimposing and displaying an image different from the input image on the image being displayed (JP-A-2008-216460 (Patent Literature 1). This kind of function is called, for example, an OSD display function. A menu screen or the like for setting is displayed as an OSD image together with the input image. As described in Patent Literature 1, in the general OSD display function, the OSD image stored in advance is superimposed on the input image. The device described in Patent Literature 1 combines colors of the OSD image in a pixel unit to thereby display OSD images of various colors.

In recent years, there is known a display device that displays a 3D (stereoscopic) image. This kind of display device adopts a configuration in which an eyeglass-type polarizing filter is used (see, for example, JP-A-07-284128 (Patent Literature 2)) or a configuration in which a lenticular lens is arranged on a display surface (see, for example, JP-A-05-304685 (Patent Literature 3)) to thereby show different images to the right eye and the left eye of a viewer to display a three-dimensional image.

Concerning a function of superimposing and displaying an image different from an input image on the input image such as the OSD display function, the related art has not provided a solution as to how the OSD image or the like is superimposed and displayed on the input image when the input image is a stereoscopic image. The stereoscopic image is formed by a pair of an image for the right eye and an image for the left eye. On the other hand, the OSD image or the like in the past is a plane image. Therefore, the stereoscopic image cannot be processed by a method same as a method of superimposing plane images each other. However, it has not been examined, for example, how the OSD image or the like formed by the plane image is superimposed on the stereoscopic image.

Most of display devices that display the stereoscopic image are adapted to the display of the plane image as well. Therefore, the input image is the plane image in some cases and is the stereoscopic image in other cases. However, it has not been examined how processing for superimposing images is combined according to whether the input image is the stereoscopic image or the plane image.

SUMMARY

An advantage of some aspects of the invention is to provide a display device that can effectively display an image such as an OSD image different from an input image together with the input image and a control method for the display device.

An aspect of the invention is directed to a display device that displays, on the basis of input image data, a stereoscopic image including an image for the left eye and an image for the right eye, the display device including: an image output unit configured to output image data of the image for the left eye and image data of the image for the right eye on the basis of the input image data; a memory configured to store different image data, which is image data different from the input image data; an image processing unit configured to read out the different image data stored in the memory, apply, to the image data of the image for the left eye in the image data output by the image output unit, processing for arranging the different image data in a position for the left eye and combining the different image data with the image data of the image for the left eye, and apply, to the image data of the image for the right eye in the image data output by the image output unit, processing for arranging the different image data in a position for the right eye and combining the different image data with the image data of the image for the right eye; and a display unit configured to display an image on the basis of image data for the left eye and image data for the right eye processed by the image processing unit.

According to the aspect of the invention, the display device that outputs the image data of the image for the left eye and the image data of the image for the right eye and displays the stereoscopic image on the basis of the input image data can arrange the different image data stored in the memory in appropriate positions with respect to the respective image data of the image for the left eye and image data of the image for the right eye. Consequently, it is possible to combine an image such as an OSD image different from an input image, which is, for example, a stereoscopic image, with the input image using one different image data stored in the memory and display a combined image of the OSD image and the input image. Therefore, since the capacity of the memory that stores the different image data may be small, it is possible to realize improvement of efficiency of use of the memory. Since the positions where the different image data is arranged in the respective image data of the image for the left eye and image data of the image for the right eye can be respectively designated, it is possible to display a different image as a plane image and display the different image as a stereoscopic image. It is easy to arbitrarily adjust a parallax when the different image is display as the stereoscopic image. Therefore, it is possible to combine the different image with the input image, which is the stereoscopic image, and effectively display a combined image of the different image and the input image.

The display device may include a buffer configured to temporarily store the image data output by the image output unit. The image processing unit may include: a register having retained therein information concerning the position of the different image data in the image data of the image for the left eye and information concerning the position of the different image data in the image data of the image for the right eye; a position determining unit configured to read out the information concerning the positions of the different image data retained in the register and determine a position where the different image data is arranged in the image data stored in the buffer; and a combination processing unit configured to apply, to the image data stored in the buffer, processing for arranging the different image data in the position determined by the position determining unit and combining the different image data with the image data.

According to this configuration, the information concerning the position of the different image data in the image data of the image for the left eye and the information concerning the position of the different image data in the image data of the image for the right eye are read out from the register. The different image data is arranged in the position based on the read-out information and combined with the image data. Consequently, in the respective image data of the image for the left eye and image data of the image for the right eye, it is possible to quickly arrange the different image data in appropriate positions.

In the display device, the image output unit may alternately output the image data of the image for the left eye and the image data of the image for the right eye and output an identification signal indicating whether the image data being output is the data of the image for the left eye or the data of the image for the right eye. The image processing unit may include: a first register retain information concerning the position of the different image data arranged in the image data of the image for the left eye; and a second register retain information concerning the position of the different image data arranged in the image data of the image for the right eye. The position determining unit may switch, on the basis of the identification signal, the register from which the information concerning the position of the different image data is read out.

According to this configuration, the register is switched for the respective image data of the image for the left eye and image data of the image for the right eye, which are alternately output, according to timing when the image data is output. Consequently, it is possible to quickly execute processing for determining positions where the different image data is arranged in the respective image data of the image for the left eye and image data of the image for the right eye.

In the display device, the image output unit may generate the image data of the image for the left eye and the image data of the image for the right eye and alternately output the image data on the basis of a frame-sequential, line alternative, or side-by-side image data of a stereoscopic image and generate and output an identification signal indicating whether the image data being output is the data of the image for the left eye or the data of the image for the right eye.

According to this configuration, it is possible to arrange the different image data in appropriate positions in the respective image data of the image for the left eye and image data of the image for the right eye, which are alternately output on the basis of the frame-sequential, line alternative, or side-by-side image data of the stereoscopic image, and combine the different image data with the image data.

Another aspect of the invention is directed to a control method for a display device that displays a stereoscopic image including an image for the left eye and an image for the right eye, the control method including: outputting image data of the image for the left eye and image data of the image for the right eye on the basis of the input image data; reading out different image data, which is image data different from the input image data, from a memory in which the different image data is stored, applying, to the image data of the image for the left eye, processing for arranging the different image data in a position for the left eye and combining the different image data with the image data of the image for the left eye, and applying, to the image data of the image for the right eye, processing for arranging the different image data in a position for the right eye and combining the different image data with the image data of the image for the right eye; and displaying an image on the basis of processed image data for the left eye and processed image data for the right eye.

According to the aspect of the invention, the display device that outputs the image data of the image for the left eye and the image data of the image for the right eye and displays the stereoscopic image on the basis of the input image data can arrange the different image data stored in the memory in appropriate positions in the respective image data of the image for the left eye and image data of the image for the right eye. Consequently, it is possible to combine an image such as an OSD image different from an input image, which is, for example, a stereoscopic image, with the input image using one different image data stored in the memory and display a combined image of the different image and the input image. Since the positions where the different image data is arranged in the respective image data of the image for the left eye and image data of the image for the right eye can be respectively designated, it is possible to display the different image as a plane image and display the different image as a stereoscopic image. It is easy to arbitrarily adjust a parallax when the different image is display as the stereoscopic image. Therefore, it is possible to combine the different image with the input image, which is the stereoscopic image, and effectively display a combined image of the different image and the input image.

According to the aspects of the invention, it is possible to arrange the different image in appropriate positions in the respective image data of the image for the left eye and image data of the image for the right eye and combine the different image data with the image data. It is possible to effectively display an image such as an OSD image together with an input image.

BRIEF DESCRIPTION OF THE DRAWINGS

The invention will be described with reference to the accompanying drawings, wherein like numbers reference like elements.

FIGS. 4A and 4B are diagrams showing examples of images output by the image processing unit of the projector, wherein FIG. 4A shows an example of an image for the left eye and FIG. 4B shows an example of an image for the right eye.

DESCRIPTION OF EXEMPLARY EMBODIMENTS

First Embodiment

Embodiments of the invention are explained below with reference to the accompanying drawings.

Figure 1:
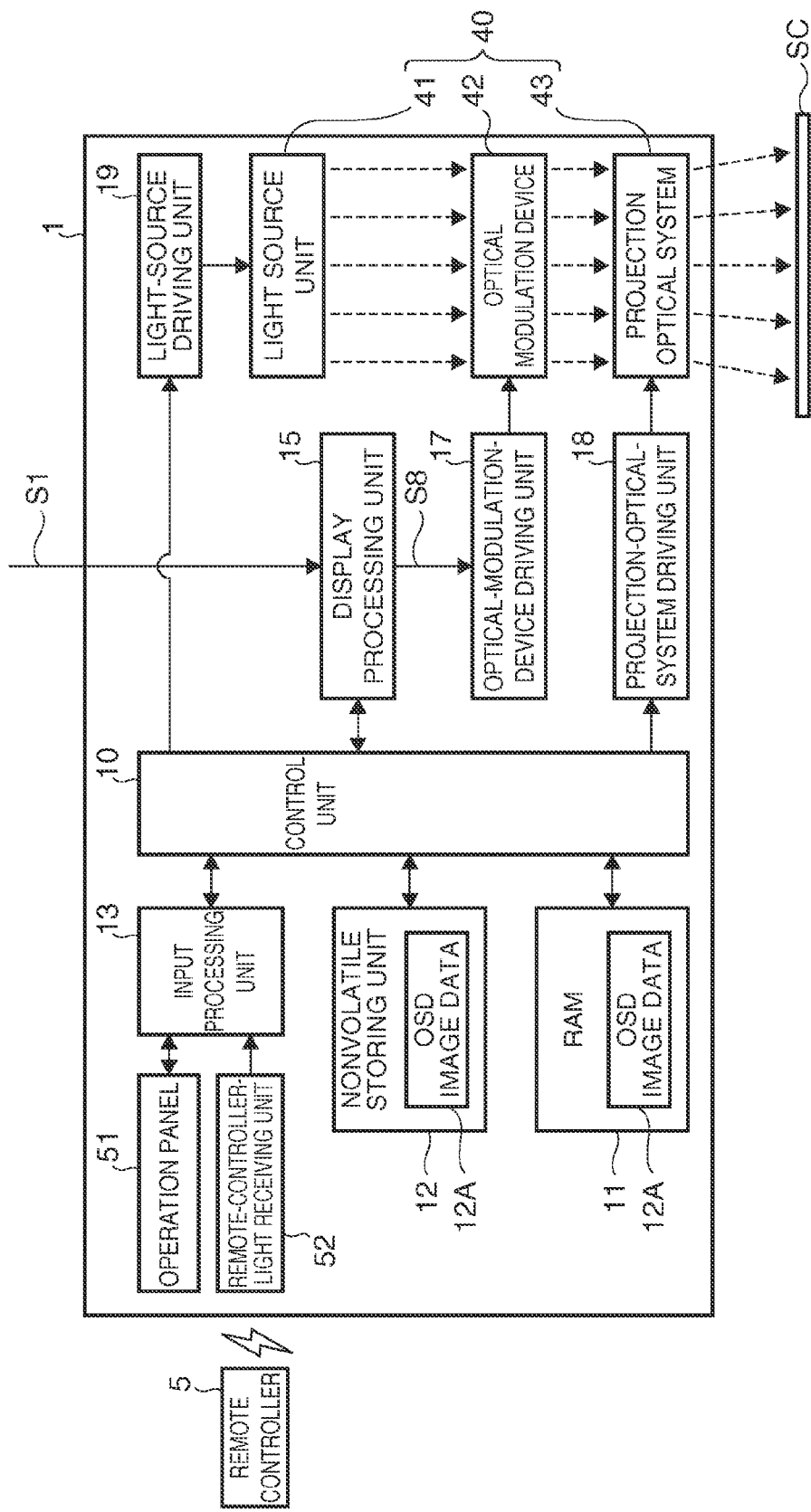
FIG. 1 is a functional block diagram of a projector according to a first embodiment.

FIG. 1 is a block diagram showing the overall configuration of a projector 1 functioning as a display device according to a first embodiment. The projector 1 is a device connected to an external image supply device (not shown in the figure) such as a personal computer or various video players and configured to project input image data S1 input from the image supply device on a projection surface such as a screen SC. Examples of the image supply device include video output apparatuses such as a video player, a DVD player, a television tuner apparatus, a set top box of a CATV, and a video game apparatus and a personal computer. In an example explained in this embodiment, digital image data of a moving image is input from the image supply device to a display processing unit 15 as the input image data S1. The digital image data includes, together with image data itself, information concerning a format of the digital image data (including a format of a stereoscopic video and a frame rate).

The projector 1 can display both of a still image and a moving image (a video). In an example explained below, a moving image input from the image supply device is output and displayed. However, in the following explanation, processing for displaying the input image data S1 can be directly applied when a still image is displayed.

In this embodiment, the screen SC stands substantially upright and a screen surface is formed in a rectangular shape.

The projector 1 roughly includes a display unit 40 (display means) configured to perform formation of an optical image and an image processing system configured to electrically process the image displayed by the display unit 40. The display unit 40 includes a light source unit 41, an optical modulation device 42, and a projection optical system 43. The light source unit 41 includes a light source including a Xenon lamp, an extra-high pressure mercury lamp, or an LED. The light source unit 41 may include a reflector and an auxiliary reflector configured to guide light emitted by the light source to the optical modulation device 42. Alternatively, the light source unit 41 may include a lens group (not shown in the figure) for improving an optical characteristic of projected light, a sheet polarizer, or a dimming device configured to reduce a light amount of the light generated by the light source on a path leading to the optical modulation device 42.

The optical modulation device 42 is equivalent to modulating means for modulating, on the basis of image data, light emitted from the light source unit 41. The optical modulation device 42 is configured by, for example, a system employing three transmissive or reflective liquid crystal light valves corresponding to the respective colors of R, G, and B or a system employing three digital mirror devices. The optical modulation device 42 can be configured by a DMD system in which a color wheel configured to transmit RGB lights among lights included in white light emitted by the light source and one digital mirror device (DMD) are combined. In this embodiment, the optical modulation device 42 is configured using the liquid crystal light valve. The optical modulation device 42 includes a transmissive liquid crystal panel on which a plurality of pixels are arranged in a matrix shape. The optical modulation device 42 forms an image using the plurality of pixels and modulates the light generated by the light source using the formed image. The optical modulation device 42 is driven by an optical-modulation-device driving unit 17 explained below. The optical modulation device 42 changes the transmittance of the light in the pixels arranged in the matrix shape to thereby form an image.

The projection optical system 43 includes a zoom lens configured to perform expansion and reduction and adjustment of a focal point of an image to be projected, a motor for zoom adjustment configured to adjust a degree of zoom, and a motor for focus adjustment configured to perform adjustment of a focus. The projection optical system 43 projects the light modulated by the optical modulation device 42 on the screen SC using the zoom lens to form an image.

A projection-optical-system driving unit 18 and a light-source driving unit 19 are connected to the display unit 40. The projection-optical-system driving unit 18 drives the motors included in the projection optical system 43 according to the control by a control unit 10. The light-source driving unit 19 drives the light source included in the light source unit 41 according to the control by the control unit 10.

The image processing system mainly includes the control unit 10 configured to collectively control the entire projector 1. The image processing system further includes a RAM 11 configured to temporarily store data to be processed by the control unit 10, computer programs to be executed by the control unit 10, and the like, a nonvolatile storing unit 12 having stored therein data to be processed by the control unit 10 and computer programs and the like to be executed by the control unit 10, an input processing unit 13 configured to detect operation performed via an operation panel 51 and a remote-controller-light receiving unit 52, the display processing unit 15 (image processing means) configured to process the input image data S1 according to the control by the control unit 10, and the optical-modulation-device driving unit 17 configured to drive the optical modulation device 42 on the basis of a video signal output from the display processing unit 15 and performs rendering.

The control unit 10 reads out and executes a control program stored in the nonvolatile storing unit 12 to thereby control the units of the projector 1. The control unit 10 detects, on the basis of an operation signal input from the input processing unit 13, content of operation performed by a user and controls the display processing unit 15, the optical-modulation-device driving unit 17, the projection-optical-system driving unit 18, and the light-source driving unit 19 according to the operation to project a video on the screen SC.

The RAM 11 includes a volatile semiconductor storage device such as a DRAM and stores programs, data, and the like.

The nonvolatile storing unit 12 includes a semiconductor storage device such as a PROM, an EEPROM, or a flash memory or a magnetic storage device and stores computer programs and data in a nonvolatile manner. In the nonvolatile storing unit 12, besides the control program and the data, OSD image data 12A (different image data) is stored. The OSD image data 12A is image data of an image different from the input image data S1 (a different image) such as a menu image (an image for setting) for performing setting related to a function of the projector 1. The OSD image data 12A is superimposed on the input image data S1 and displayed on the screen SC. A plurality of OSD image data 12A can also be stored in the nonvolatile storing unit 12. Among the OSD image data 12A stored in the nonvolatile storing unit 12, the OSD image data 12A to be displayed on the screen SC is read out by the control unit 10 and stored in the RAM 11. The display processing unit 15 reads out the OSD image data 12A from the RAM 11, performs processing for superimposing the OSD image data 12A on image data frame by frame of the input image data S1 to combine the OSD image data 12A with the image data, and outputs a combined image of the OSD image data 12A and the image data to the optical-modulation-device driving unit 17 as display image data 58. The optical-modulation-device driving unit 17 performs rendering on the liquid crystal panel of the optical modulation device 42 on the basis of the display image data S8, whereby the combined image is projected on the screen SC.

The operation panel 51 including various switches and indicator lamps for allowing the user to perform operation is arranged in a main body of the projector 1. The operation panel 51 is connected to the input processing unit 13. The input processing unit 13 turns on or blinks the indicator lamps of the operation panel 51 as appropriate in response to an operation state or a setting state of the projector 1 according to the control by the control unit 10. When a switch of the operation panel 51 is operated, an operation signal corresponding to the operated switch is output from the input processing unit 13 to the control unit 10.

The projector 1 includes a remote controller 5 used by the user. The remote controller 5 includes various buttons and transmits an infrared signal in response to the operation of the buttons. The remote-controller-light receiving unit 52 configured to receive the infrared signal transmitted by the remote controller 5 is arranged in the main body of the projector 1.

The remote-controller-light receiving unit 52 decodes the infrared signal received from the remote controller 5, generates an operation signal indicating operation content in the remote controller 5, and outputs the operation signal to the control unit 10.

Figure 2:
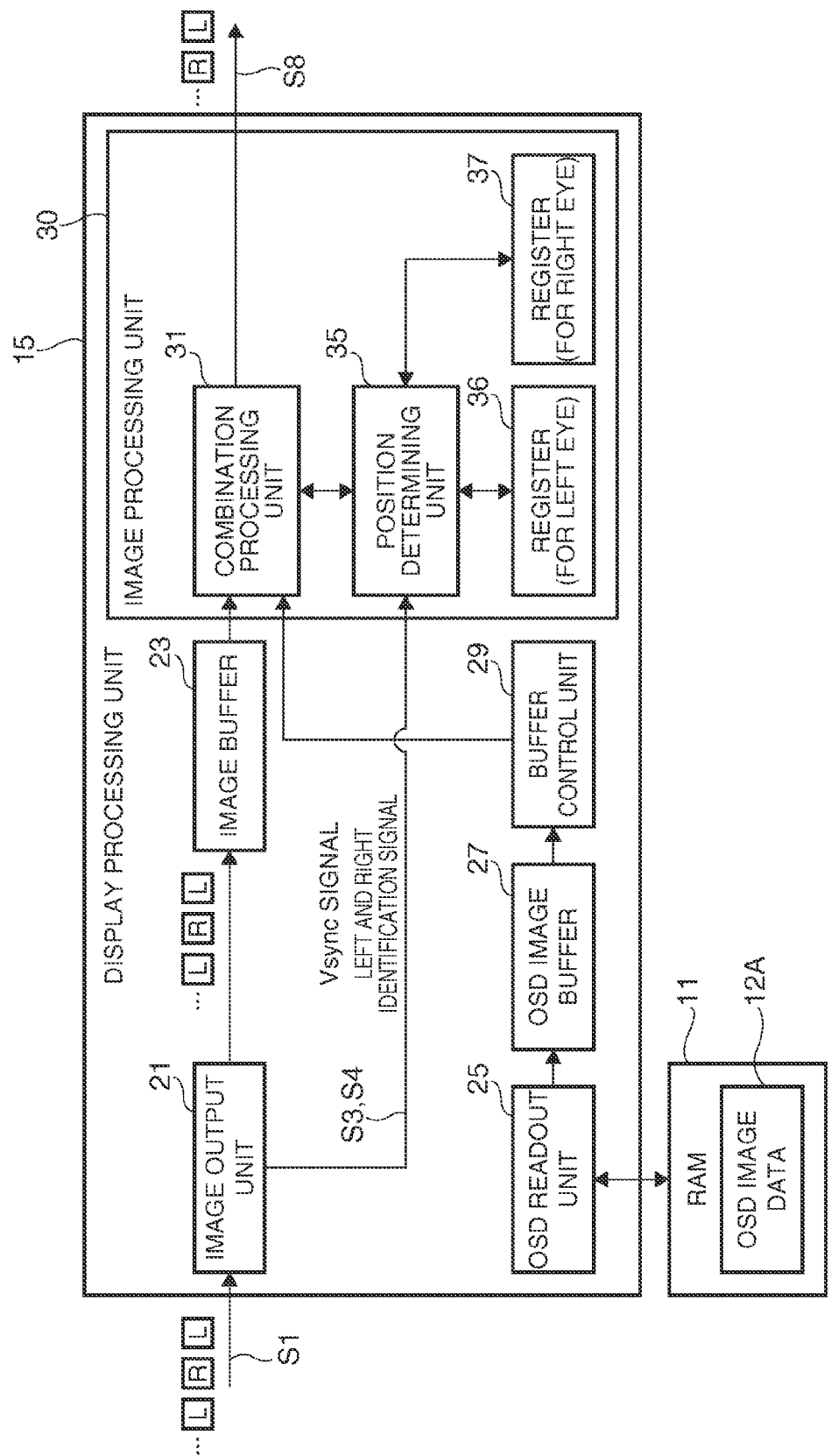
FIG. 2 is a functional block diagram of an image processing unit of the projector.

FIG. 2 is a functional block diagram showing the configuration of the display processing unit 15 in detail.

The display processing unit 15 is connected to an external image supply device (not shown in the figure). The display processing unit 15 generates, according to the control by the control unit 10, the display image data S8 on the basis of the input image data S1 input from the image supply device, and outputs the display image data S8 to the optical-modulation-device driving unit 17.

The display processing unit 15 includes an image output unit 21 (image output means) configured to output output image data S2 on the basis of the input image data S1, an image buffer 23 (a buffer) configured to temporarily store the output image data S2 output by the image output unit 21, and an image processing unit 30 that performs, for example, processing for superimposing the OSD image data 12A on the output image data S2 stored in the image buffer 23. The display processing unit 15 includes an OSD readout unit 25 configured to read out the OSD image data 12A from the RAM 11, an OSD image buffer 27 configured to temporarily store the OSD image data 12A read out by the OSD readout unit 25, and a buffer control unit 29 configured to read out, at appropriate timing, the OSD image data 12A stored in the OSD image buffer 27 and output the OSD image data 12A to the image processing unit 30.

The image output unit 21 separates the input image data S1 frame by frame and outputs the input image data S1 to the image buffer 23 as the output image data S2. In this embodiment, it is assumed that the input image data S1 is frame-sequential stereoscopic image data. In this case, a frame of an image for the left eye and a frame of an image for the right eye are alternately input to the image output unit 21. The image output unit 21 sequentially outputs the frames of the input image data S1, which are input to the image output unit 21, to the image buffer 23.

The image output unit 21 generates a Vsync signal S3 and a left and right identification signal S4 according to a clock signal included together with the input image data S1 and outputs the Vsync signal S3 and the left and right identification signal S4 to the image processing unit 30.

Figure 3:
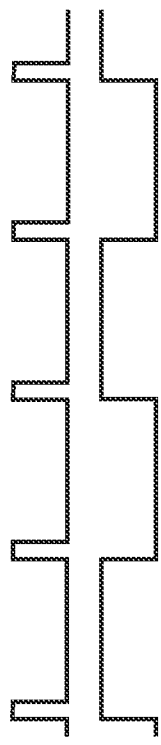
FIGS. 3A and 3B are timing charts showing output states of a Vsync signal and a left and right identification signal processed by the projector.

FIGS. 3A and 3B are timing charts showing output states of the Vsync signal S3 and the left and right identification signal S4 processed by the projector 1.

FIG. 3A shows the Vsync signal S3. The Vsync signal S3 is a vertical synchronization signal of the input image data S1. FIG. 3B shows the left and right identification signal S4. The left and right identification signal S4 is a signal indicating whether the frames of the input image data S1 are an image for the left eye or an image for the right eye. For example, a frame output while the left and right identification signal S4 is High is the image for the left eye and a frame output while the left and right identification signal S4 is Low is the image for the right eye. The left and right identification signal S4 is input to the display processing unit 15 together with the input image data S1 in synchronization with the Vsync signal S3. When outputting the output image data S2 to the image buffer 23, the image output unit 21 outputs the Vsync signal S3 and the left and right identification signal S4 in synchronization with the frames of the output image data S2.

The OSD readout unit 25 (FIG. 2) reads out the OSD image data 12A stored in the RAM 11. Among one or a plurality of OSD image data 12A stored in the non-volatile storing unit 12 (FIG. 1), the OSD image data 12A designated by the control unit 10 as image data to be displayed on the screen SC is stored in the RAM 11. The OSD readout unit 25 reads out the OSD image data 12A from the RAM 11 and outputs the OSD image data 12A to the OSD image buffer 27. The OSD image data 12A is stored in the OSD image buffer 27. The buffer control unit 29 reads out, in response to a request from the image processing unit 30, the OSD image data 12A stored in the OSD image buffer 27 and outputs the OSD image data 12A to the image processing unit 30.

The image processing unit 30 includes a combination processing unit 31 (combination processing means) configured to combine image data of the output image data S2 stored in the image buffer 23 and the OSD image data 12A input from the buffer control unit 29 and generate the display image data S8, a position determining unit 35 (position determining means) configured to determine a position where the OSD image data 12A is arranged in the image data of the output image data S2, a register (a first register) 36 having stored therein information for designating the position of the OSD image data 12A in the image for the left eye, and a register (a second register) 37 having stored therein information for designating the position of the OSD image data 12A in the image for the right eye.

The register 36 has retained therein, for example, a coordinate at the upper left corner of the OSD image data 12A as information concerning a position where the OSD image data 12A is arranged in image data of a frame for the left eye. The coordinate is, for example, an orthogonal coordinate system having an origin at the upper left corner of the frame for the left eye. Similarly, the register 37 has retained therein, for example, a coordinate at the upper left corner of the OSD image data 12A as information concerning a position where the OSD image data 12A is arranged in image data of a frame for the right eye.

Figure 4:
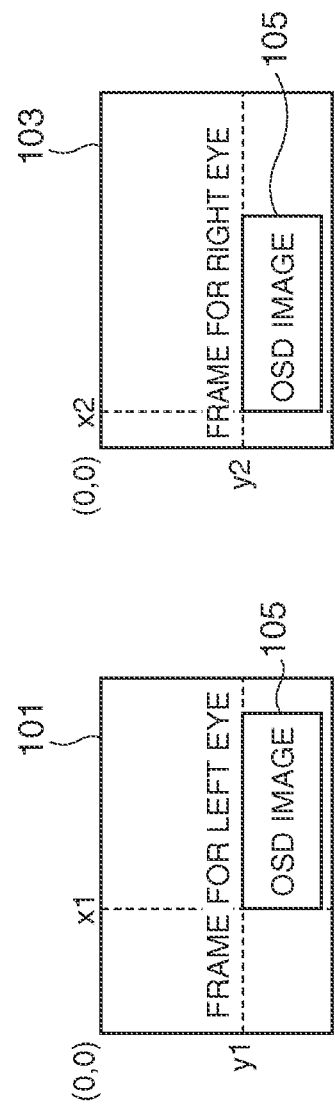

FIGS. 4A and 4B are diagrams showing examples of images displayed on the basis of the display image data S8 output by the image processing unit 30. FIG. 4A shows an example of the frame for the left eye and FIG. 4B shows an example of the frame for the right eye.

In the examples shown in FIGS. 4A and 4B, an OSD image 105 is arranged in different positions in a frame for the left eye 101 and a frame for the right eye 103. The position of the OSD image 105 in the frame 101 is set in $(x_1, y_1)$ in a $(x, y)$ coordinate system with an original set at the upper left corner of the frame 101. The position of the OSD image 105 in the frame 103 is set in $(x_2, y_2)$ in a $(x, y)$ coordinate system having an origin at the upper left corner of the frame 103. In the examples shown in FIGS. 4A and 4B, a parallax is provided in the position of the OSD image 105. That is, the image processing unit 30 combines the same image (the OSD image 105) with (superimposes the same image on) the frame for the left eye 101 and the frame for the right eye 103. A position where the OSD image 105 is combined in the frame for the left eye 101 and a position where the OSD image 105 is combined in the frame for the right eye 103 are different. Therefore, for example, if a person wearing an eyeglass-type polarizing filter looks at projected images of the frames 101 and 103 projected on the screen SC, an OSD image is stereoscopically seen.

When a parallax is not provided between the position of the OSD image 105 in the frame 101 and the position of the OSD image 105 in the frame 103, in a projected image projected on the screen SC, the OSD image 105 is seen as a plane image. In this way, when the input image data S1 is image data of a stereoscopic image, the projector 1 can display the OSD image 105 as a plane image and display the OSD image as a stereoscopic image.

The position determining unit 35 determines, on the basis of the Vsync signal S3 input from the image output unit 21, timing for reading out an image from the image buffer 23 and timing for requesting the buffer control unit 29 to output the OSD image data 12A and outputs the timings to the combination processing unit 31.

The position determining unit 35 determines, according to the Vsync signal S3 and the left and right identification signal S4, whether an image to be combined by the combination processing unit 31 is an image for the left eye or an image for the right eye. The position determining unit 35 acquires information for designating the position of the OSD image data 12A from of the register 36 or 37 corresponding to the side of the determined image and outputs the information to the combination processing unit 31. That is, when image data acquired from the image buffer 23 next is image data of a frame for the left eye, the position determining unit 35 acquires the information from the register 36 and designates the position indicated by the acquired information to the combination processing unit 31. When the image data acquired from the image buffer 23 next is image data of a frame for the right eye, the position determining unit 35 acquires the information from the register 37 and designates the position indicated by the acquired information to the combination processing unit 31.

The combination processing unit 31 acquires image data for one frame of the output image data S2 from the image buffer 23 at timing designated by the position determining unit 35 and acquires the OSD image data 12A in the OSD image buffer 27 through the buffer control unit 29. The combination processing unit 31 expands the image data for one frame in a not-shown frame memory and renders the OSD image data 12A over the image data to thereby combine the OSD image data 12A with the image data (superimpose the OSD image data 12A on the image data) to obtain an image. The combination processing unit 31 reads out image data of the obtained image from the frame memory and outputs the image data to the optical-modulation-device driving unit 17 (FIG. 1) as the display image data S8.

In this embodiment, a background of an OSD image based on the OSD image data 12A may be transparent or may be non-transparent. When the OSD image is transparent or non-transparent, an image behind the OSD image can be displayed to be seen through. However, when the input image data S1 is displayed as a stereoscopic image and the OSD image is displayed as a plane image, the OSD image and the image behind the OSD image are seen differently. In such a case, it is desirable to make the background of the OSD image non-transparent because the images are seen more naturally.

Figure 5:
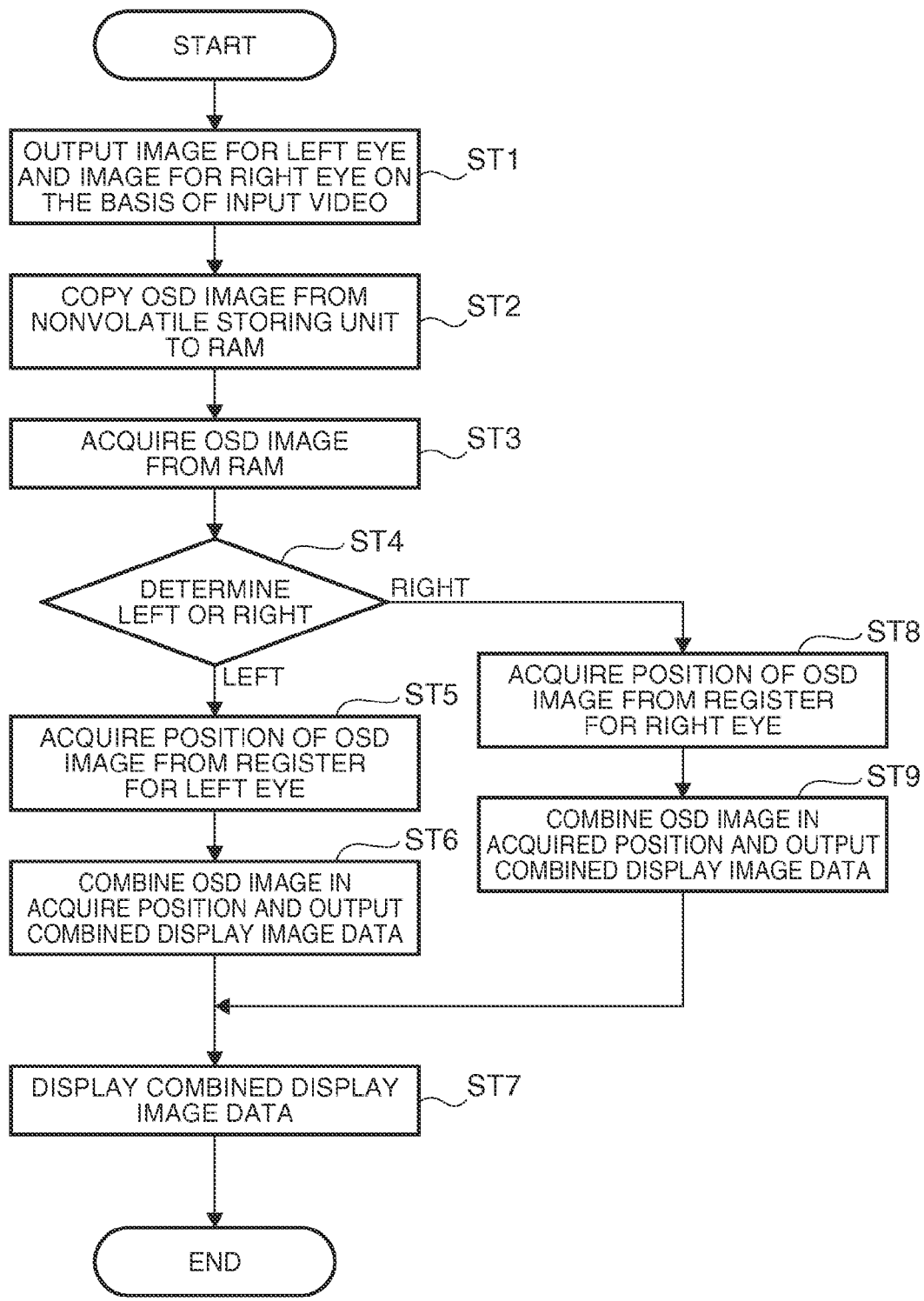
FIG. 5 is a flowchart for explaining the operation of the projector.

FIG. 5 is a flowchart for explaining the operation of the projector 1.

First, the image output unit 21 outputs, according to the control by the control unit 10, the output image data S2 including image data of an image for the left eye and image data of an image for the right eye on the basis of the input image data S1, causes the image buffer 23 to store the output image data S2, and outputs the Vsync signal S3 and the left and right identification signal S4 to the position determining unit 35 (step ST1). The control unit 10 reads out the OSD image data 12A from the non-volatile storing unit 12 and causes the RAM 11 to store the OSD image data 12A (step ST2). This processing in step ST12 may be executed before the input image data 51 is input.

Subsequently, according to the control by the control unit 10, the OSD reading unit 25 reads out the OSD image data 12A from the RAM 11 and stores the OSD image data 12A in the OSD image buffer 27 (step ST3).

The position determining unit 35 determines, on the basis of the Vsync signal S3 and the left and right identification signal S4, image data read out from the image buffer 23 next is image data for the left eye or image data for the right eye (step ST4).

When the image data read out from the image buffer 23 next is the image data for the left eye, the position determining unit 35 acquires information indicating the position of the OSD image data 12A from the register 36 for the left eye and designates the position to the combination processing unit 31 (step ST5). The combination processing unit 31 performs processing for superimposing the OSD image data 12A in the designated position of the image data acquired from the image buffer 23 and outputs the combined display image data S8 to the optical-modulation-device driving unit 17 (step ST6). Thereafter, the display unit 40 displays an image on the screen SC on the basis of the display image data S8 (step ST7).

On the other hand, when the image data read out from the image buffer 23 next is the image data for the right eye, the position determining unit 35 acquires information indicating the position of the OSD image data 12A from the register 37 for the right eye and designates the position to the combination processing unit 31 (step ST8). The combination processing unit 31 performs processing for superimposing the OSD image data 12A in the designated position of the image data acquired from the image buffer 23 and outputs the combined display image data S8 to the optical-modulation-device driving unit 17 (step ST9). The operation shifts to step ST7.

As explained above, the projector 1 according to the first embodiment of the invention is the projector 1 that displays a stereoscopic image including an image for the left eye and an image for the right eye on the basis of the input image data S1. The projector 1 includes the image output unit 21 configured to output image data of the image for the left eye and image data of the image for the right eye on the basis of the input image data S1, the RAM 11 having stored therein the OSD image data 12A, which is image data different from the input image data S1, the image processing unit 30 configured to read out the OSD image data 12A stored in the RAM 11, apply, to the image data of the image for the left eye in the output image data S2 output by the image output unit 21, processing for arranging the different image data in a position for the left eye and combining the different image data with the image data of the image for the left eye, and apply, to the image data of the image for the right eye in the output image data S2 output by the image output unit 21, processing for arranging the different image data in a position for the right eye and combining the different image data with the image data of the image for the right eye, and the display unit 40 configured to display an image on the basis of image data for the left eye and image data for the right eye processed by the image processing unit 30. Consequently, since the projector 1 arranges the OSD image data 12A in appropriate positions with respect to the respective image data of the image for the left eye and image data of the image for the right eye, the projector 1 can superimpose and display an OSD image on the input image data S1, which is the stereoscopic image, using one OSD image data 12A. Therefore, since the capacity of the RAM 11 that stores the OSD image data 12A may be small, it is possible to realize improvement of efficiency of use of the RAM 11. Since the positions where the different image data is arranged in the respective image data of the image for the left eye and image data of the image for the right eye can be respectively designated, it is possible to display the OSD image as a plane image and display the OSD image as a stereoscopic image. It is easy to arbitrarily adjust a parallax when the OSD image is display as the stereoscopic image. In this way, the projector 1 can combine the different image with the input image, which is the stereoscopic image, and effectively display a combined image of the different image and the input image.

The projector 1 includes the image buffer 23 configured to temporarily store the image data output by the image output unit 21. The image processing unit 30 includes the registers 36 and 37 having retained therein information concerning the position of the OSD image data 12A in the image data of the image for the left eye and information concerning the position of the OSD image data 12A in the image data of the image for the right eye, the position determining unit 35 configured to read out the information concerning the positions of the OSD image data 12A retained in the registers 36 and 37 and determine a position where the OSD image data 12A is arranged, and the combination processing unit 31 configured to apply, to the image data stored in the image buffer 23, processing for arranging the OSD image data 12A in the position determined by the position determining unit 35 and combining the OSD image data 12A with the image data. Consequently, in the respective image data of the image for the left eye and image data of the image for the right eye, it is possible to quickly arrange the OSD image data 12A in appropriate positions.

Further, the image output unit 21 alternately outputs the image data of the image for the left eye and the image data of the image for the right eye and outputs the left and right identification signal S4 indicating whether the image data being output is the data of the image for the left eye or the data of the image for the right eye. The image processing unit 30 includes the register 36 having retained therein information concerning the position of the OSD image data 12A arranged in the image data of the image for the left eye and the register 37 having retained therein information concerning the position of the different image data arranged in the image data of the image for the right eye. The position determining unit 35 switches, on the basis of the left and right identification signal S4, the registers 36 and 37 from which the information concerning the position of the OSD image data 12A is read out. Consequently, it is possible to quickly execute processing for determining positions where the OSD image data 12A is arranged in the respective image data of the image for the left eye and image data of the image for the right eye.

Second Embodiment

Figure 6:
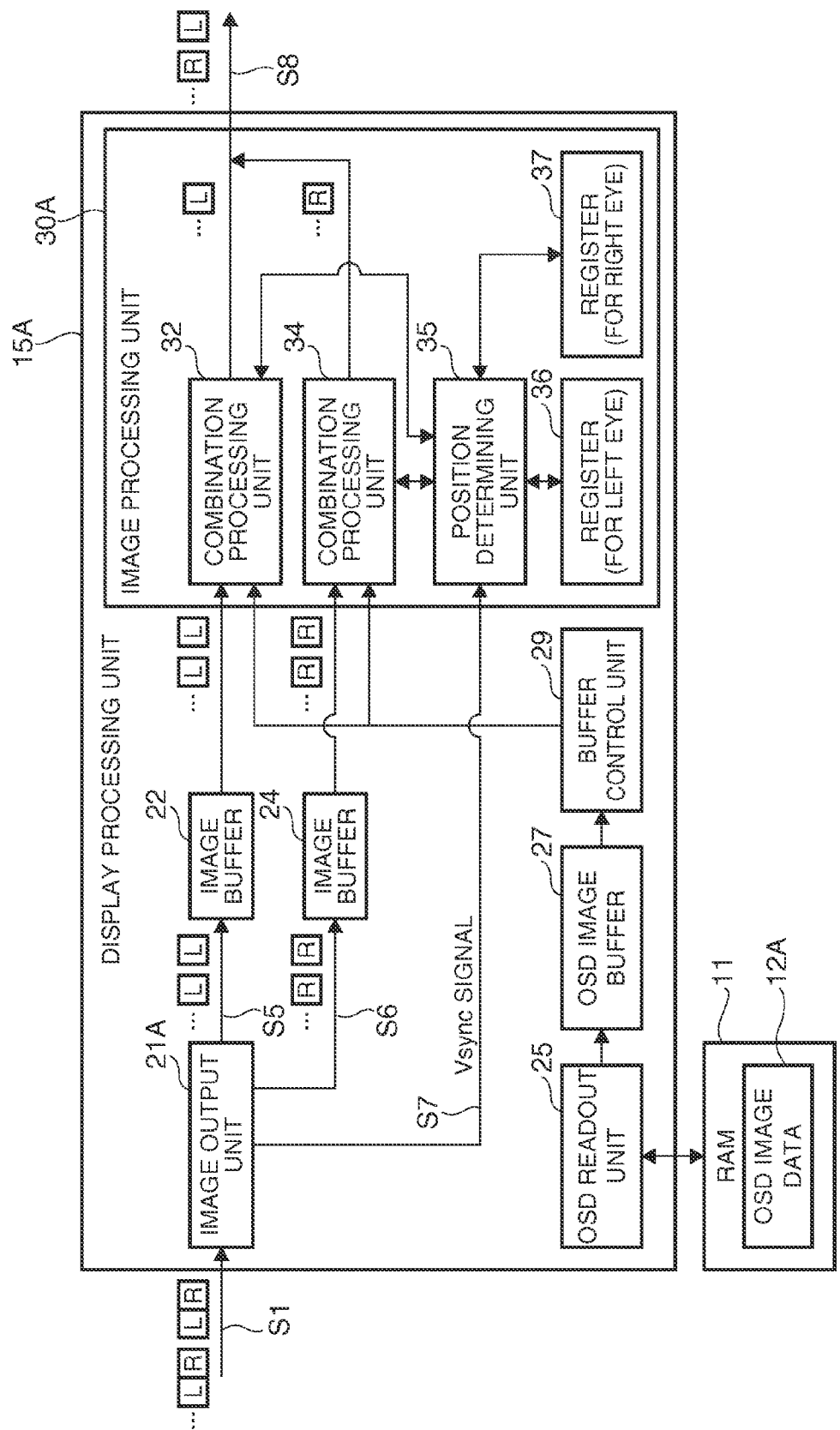
FIG. 6 is a functional block diagram of an image processing unit of a projector according to a second embodiment.

FIG. 6 is a functional block diagram showing the configuration of a display processing unit 15A according to a second embodiment of the invention.

In an example explained in the second embodiment, the input image data S1 input from an image supply device (not shown in the figure) is side-by-side stereoscopic image data. The configuration of the second embodiment can be easily applied as well when the input image data S1 is a top-and-bottom stereoscopic image.

The display processing unit 15A shown in FIG. 6 is included in the projector 1 instead of the display processing unit 15 shown in FIG. 1. In the second embodiment, units configured the same as the units in the first embodiment are denoted by the same reference numerals and signs and explanation of the units is omitted.

The display processing unit 15A includes an image output unit 21A instead of the image output unit 21 (FIG. 2). The image output unit 21A has a function of dividing frames included in the input image data S1 and generating image data of a frame for the left eye and image data of a frame for the right eye. In a side-by-side image, the right half of one frame is an image for the right eye and the left half of the one frame is an image for the left eye. To display the side-by-side image as a stereoscopic image, it is necessary to perform processing for separating the one frame into the right half and the left half and expanding separated respective images in the lateral direction and generate the frame for the right eye and the frame for the left eye.

The image output unit 21A outputs a frame of the left half obtained by separating a frame of the input image data S1 to an image buffer 22 as output image data S5. That is, the image buffer 22 is a buffer memory for the left eye. The image data of the frame for the left eye extracted from the input image data 51 is sequentially stored in the image buffer 22. The image output unit 21A outputs, as output image data S6, a frame of the right half obtained by separating the frame of the input image data 51 to an image buffer 24. That is, the image buffer 24 is a buffer memory for the right eye. The image data of the frame for the lefty eye extracted from the input image data S1 is sequentially stored in the image buffer 24.

Further, the image output unit 21A generates a Vsync signal S7 and outputs the Vsync signal S7 to an image processing unit 30A. The Vsync signal S7 is a vertical synchronization signal generated by the image output unit 21A on the basis of a vertical synchronization signal input together with the input image data S1. When the input image data S1 is side-by-side image data, since frames are separated by the image output unit 21A, the number of frames is doubled. Therefore, a vertical synchronization frequency is doubled to display all the frames. The image output unit 21A generates the Vsync signal S7 having a frequency twice as high as the vertical synchronization frequency of the input image data S1 and outputs the Vsync signal S7 to the position determining unit 35 of the image processing unit 30A.

The image processing unit 30A is provided instead of the image processing unit 30 (FIG. 2). Like the image processing unit 30, the image processing unit 30A includes the position determining unit 35 and the registers 36 and 37. Further, the image processing unit 30A includes two combination processing units 32 and 34 configured to combine the OSD image data 12A with the image data like the combination processing unit 31. The combination processing unit 32 performs processing for combining the OSD image data 12A with image data for the left eye stored in the image buffer 22. On the other hand, the synchronization processing unit 34 performs processing for combining the OSD image data 12A with image data for the right eye stored in the image buffer 24.

The position determining unit 35 designates, according to the Vsync signal S7, to the respective combination processing units 32 and 34, timing for acquiring image data from the image buffers 22 and 24 and timing for acquiring the OSD image data 12A in the OSD image buffer 27 through the buffer control unit 29.

The position determining unit 35 reads out information indicating the position of the OSD image data 12A in the frame for the left eye from the register 36 and designates the position to the combination processing unit 32. Similarly, the position determining unit 35 reads out information indicating the position of the OSD image data 12A in the frame for the right eye from the register 37 and designates the position to the combination processing unit 34.

With this configuration, the display processing unit 15A executes an operation explained below according to the control by the control unit 10. First, the image output unit 21A generates the output image data S5, which is image data of the frame for the left eye, and the output image data S6, which is image data of the frame for the right eye, from the input image data S1. The output image data S5 is sequentially stored in the image buffer 22 and the output image data S6 is sequentially stored in the image buffer 24.

On the other hand, the OSD readout unit 25 reads out the OSD image data 12A from the RAM 11 and stores the OSD image data 12A in the OSD image buffer 27. The OSD image data 12A stored in the OSD image buffer 27 is read out by the buffer control unit 29 in response to a request from the image processing unit 30A and output to the combination processing units 32 and 34 of the image processing unit 30A.

The combination processing unit 32 acquires the output image data S5 from the image buffer 22 at the timing designated by the position determining unit 35 and, on the other hand, acquires the OSD image data 12A input from the buffer control unit 29. The combination processing unit 34 acquires the output image data S6 from the image buffer 24 at the timing designated by the position determining unit 35 and, on the other hand, acquires the OSD image data 12A input from the buffer control unit 29.

The combination processing units 32 and 34 perform processing for converting the resolution of the image data acquired from the image buffers 22 and 24. That is, since the image data acquired from the image buffers 22 and 24 are image data obtained by halving the frame of the input image data S1, the resolution in the lateral (horizontal) direction is a half. Therefore, before combining the OSD image data 12A with the image data, the combination processing units 32 and 34 perform processing for converting the resolution through, for example, interpolation of pixels to double the resolution in the horizontal direction of the image data acquired from the image buffers 22 and 24. The image data acquired from the image buffers 22 and 24 is expanded in the horizontal direction by the processing to be image data having the original aspect ratio. The information retained in the registers 36 and 37 is information for designating the position of the OSD image data 12A in the expanded image data. Therefore, the combination processing units 32 and 34 desirably perform processing for combining the OSD image data 12A with the image data after expanding the image data.

When the OSD image data 12A is data compressed to halve the resolution in the horizontal direction and information for designating the position of the OSD image data 12A in a state in which the resolution in the horizontal direction is halved is stored in the registers 36 and 37, the combination processing units 32 and 34 perform the combination before expanding the image data.

The combination processing unit 32 performs processing for arranging the OSD image data 12A in the position designated by the position determining unit 35 and combining the OSD image data 12A with the image data. The combination processing unit 34 performs processing for arranging the OSD image data 12A in the position designated by the position determining unit 35 and combining the OSD image data 12A with the image data.

Image data obtained by the combination by the combination processing units 32 and 34 are alternately output from the combination processing units 32 and 34. Therefore, the image processing unit 30A alternately outputs the image data of the frame for the left eye and the image data of the frame for the right eye as the display image data S8. Consequently, the projector 1 including the display processing unit 15A can superimpose an OSD image on a stereoscopic image and display a combined image of the OSD image and the stereoscopic image on the screen SC as in the example explained in the first embodiment.

As explained above, according to the second embodiment of the invention, when the side-by-side image data is input as the input image data S1, the projector 1 can generate the image data of the frame for the left eye and the image data of the frame for the right eye from the input image data S1, combine one OSD image data 12A stored in the RAM 11 with the image data, and display a combined image of the OSD image data 12A and the image data on the screen SC. Therefore, as in the first embodiment, since the capacity of the RAM 11 that stores the OSD image data 12A may be small, it is possible to realize improvement of efficiency of use of the RAM 11. Since the positions where the different image data is arranged in the respective image data of the image for the left eye and image data of the image for the right eye can be respectively designated, it is possible to display the OSD image as a plane image and display the OSD image as a stereoscopic image. It is easy to arbitrarily adjust a parallax when the OSD image is display as the stereoscopic image. In this way, the projector 1 can combine the different image with the input image, which is the stereoscopic image, and effectively display a combined image of the different image and the input image.

Further, in the configuration shown in FIG. 6, since the image data of the frame for the left eye are processed by the combination processing unit 32 and the image data of the frame for the right eye are processed by the combination processing unit 34, it is possible to perform the combination processing at higher speed. Therefore, even when the side-by-side image is input and processing for separating a frame of the input image data S1 and processing for resolution conversion are required, it is possible to suppress a delay of display and smoothly display an image on the screen SC. Since the input image data S1 can be processed at high speed, it is possible to handle, for example, double speed driving for doubling a vertical synchronization frequency and quadruple speed driving for quadrupling the vertical synchronization frequency and display a high-quality image on the screen SC.

Third Embodiment

Figure 7:
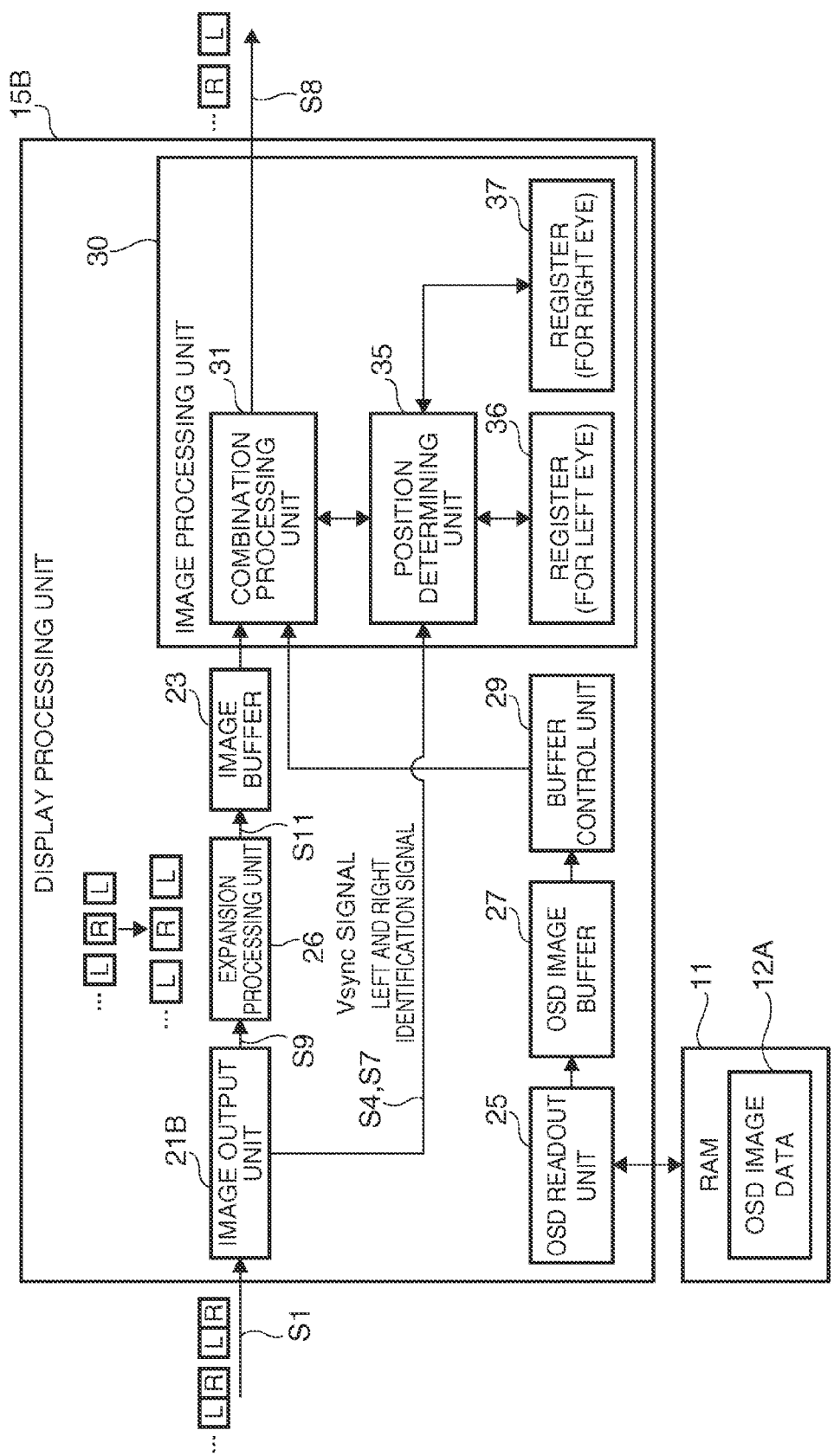
FIG. 7 is a functional block diagram of an image processing unit of a projector according to a third embodiment.

FIG. 7 is a functional block diagram showing the configuration of a display processing unit 15B according to a third embodiment of the invention.

In an example explained in the third embodiment, the input image data 51 input from an image supply device (not shown in the figure) is side-by-side stereoscopic image data. This configuration of the third embodiment can be easily applied as well when the input image data 51 is a top-and-bottom stereoscopic image.

The display processing unit 15B shown in FIG. 7 is included in the projector 1 instead of the display processing unit 15 shown in FIG. 1. In the third embodiment, units configured the same as the units in the first and second embodiments are denoted by the same reference numerals and signs and explanation of the units is omitted.

The display processing unit 15B includes an image output unit 21B instead of the image output unit 21 (FIG. 2). Like the image output unit 21A (FIG. 6), the image output unit 21B has a function of dividing frames included in the input image data S1 and generating image data of a frame for the left eye and image data of a frame for the right eye. The image output unit 21B alternately outputs a frame of the left half obtained by separating a frame of the input image data S1 and a frame of the right half obtained by separating the frame of the input image data S1 to an expansion processing unit 26 as output image data S9.

Further, the image output unit 21B generates the Vsync signal S7 and outputs the Vsync signal S7 to the image processing unit 30A. The Vsync signal S7 is a vertical synchronization signal generated by the image output unit 21B. The Vsync signal S7 is set to a double vertical synchronization frequency compared with the vertical synchronization frequency of the input image data S1 according to separation of side-by-side image data. The image output unit 21B generates the Vsync signal S7 and outputs the Vsync signal S7 to the image processing unit 30 together with the left and right identification signal S4 indicating whether image data being output to the expansion processing unit 26 is a frame for the left eye or a frame for the right eye.

The expansion processing unit 26 performs processing for converting the resolution of image data of the frames included in the output image data S9 output by the image output unit 21B. The image data output by the image output unit 21B is image data obtained by halving the frame of the input image data S1. Therefore, the expansion processing unit 26 performs processing for converting the resolution through, for example, interpolation of pixels to double the resolution in the horizontal direction of the image data. The image data after the processing is changed to image data having resolution same as the resolution of the input image data S1 and output to the image buffer 23 as output image data S11.

The image buffer 23 temporarily stores the output image data S11 input from the expansion processing unit 26.

The image processing unit 30 is explained in the first embodiment. The image processing unit 30 includes the combination processing unit 31, the position determining unit 35, and the registers 36 and 37. The image processing unit 30 acquires, frame by frame, the output image data S11 stored in the image buffer 23, performs processing for superimposing the OSD image data 12A on the output image data S11 to combine the OSD image data 12A with the output image data S11, and outputs combined image data of the OSD image data 12A and the output image data S11 to the optical-modulation-device driving unit 17 as the display image data S8.

As explained above, according to the third embodiment of the invention, when the side-by-side image data is input as the input image data S1, the projector 1 can generate the image data of the frame for the left eye and the image data of the frame for the right eye from the input image data S1, combine one OSD image data 12A stored in the RAM 11 with the image data, and display a combined image of the OSD image data 12A and the image data on the screen SC. Therefore, as in the first embodiment, since the capacity of the RAM 11 that stores the OSD image data 12A may be small, it is possible to realize improvement of efficiency of use of the RAM 11. Since the positions where the different image data is arranged in the respective image data of the image for the left eye and image data of the image for the right eye can be respectively designated, it is possible to display the OSD image as a plane image and display the OSD image as a stereoscopic image. It is easy to arbitrarily adjust a parallax when the OSD image is display as the stereoscopic image. In this way, the projector 1 can combine the different image with the input image, which is the stereoscopic image, and effectively display a combined image of the different image and the input image.

Further, in the configuration shown in FIG. 7, the expansion processing unit 26 applies processing for converting resolution to the frame for the left eye and the frame for the right eye generated on the basis of the input image data S1. Therefore, the output image data S11 output by the expansion processing unit 26 can be processed the same as frames of frame-sequential stereoscopic image data. Therefore, it is possible to superimpose the OSD image data 12A on the side-by-side input image data S1 and display a combined image of the OSD image data 12A and the input image data S1 on the screen SC using the image processing unit 30 including one combination processing unit 31.

Fourth Embodiment

Figure 8:
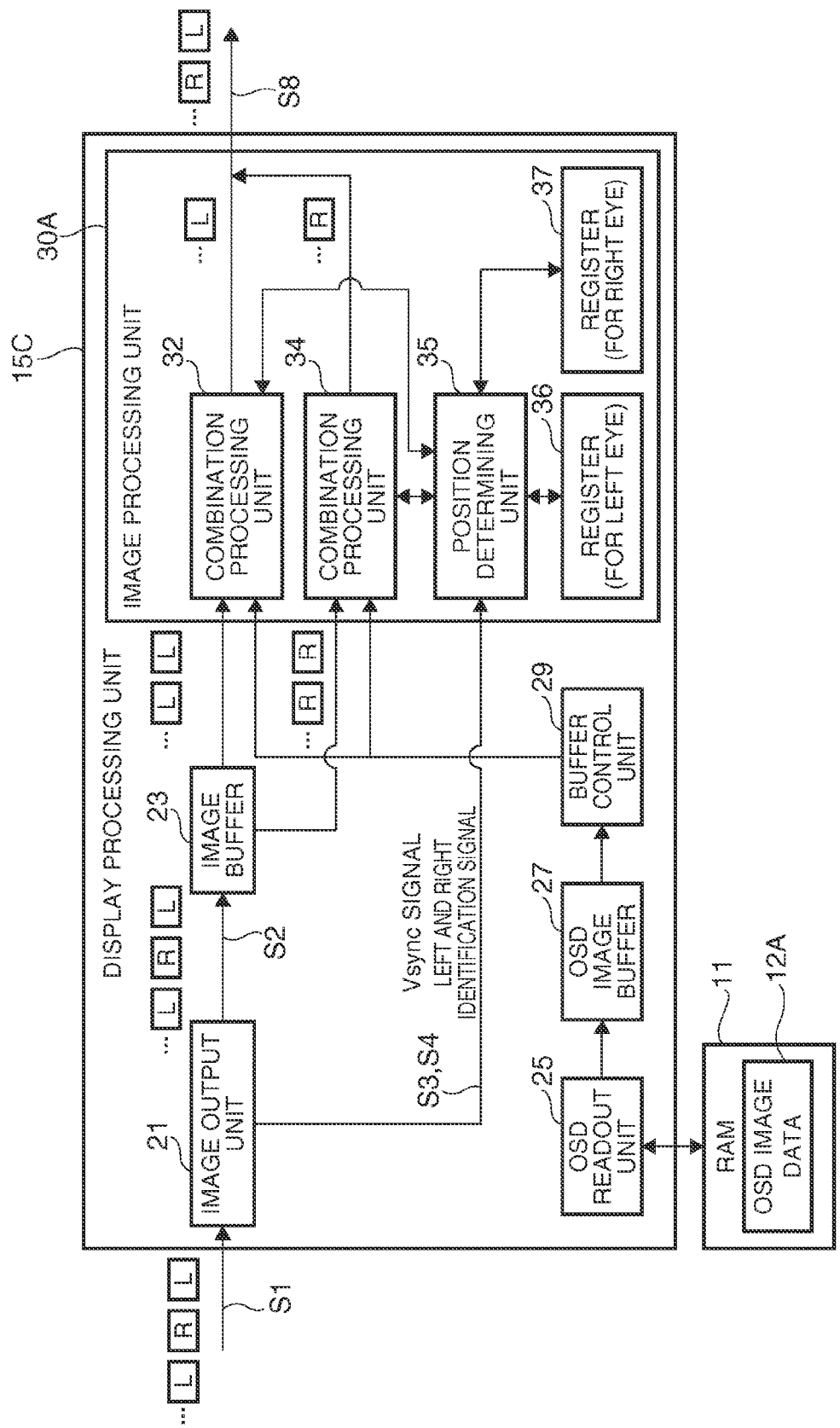
FIG. 8 is a functional block diagram of an image processing unit of a projector according to a fourth embodiment.

FIG. 8 is a functional block diagram showing the configuration of a display processing unit 15C according to a fourth embodiment of the invention.

In an example explained in the fourth embodiment, the input image data S1 input from an image supply device (not shown in the figure) is frame-sequential stereoscopic image data.

The display processing unit 15C shown in FIG. 8 is included in the projector 1 instead of the display processing unit 15 shown in FIG. 1. In the fourth embodiment, units configured the same as the units in the first, second, and third embodiments are denoted by the same reference numerals and signs and explanation of the units is omitted.

The display processing unit 15C includes the image output unit 21, the image buffer 23, the OSD readout unit 25, the OSD image buffer 27, and the buffer control unit 29 shown in FIG. 2.

Further, the display processing unit 15C includes the image processing unit 30A. The image processing unit 30A includes the two combination processing units 32 and 34, the position determining unit 35, and the registers 36 and 37.

In this embodiment, the combination processing units 32 and 34 respectively acquire image data frame by frame from the image buffer 23. Image data of a frame for the left eye and image data of a frame for the right eye are alternately input to the image buffer 23 from the image output unit 21 and stored. The combination processing unit 32 acquires the image data of the frame for the left eye from the image buffer 23. The combination processing unit 34 acquires the image data of the frame for the right eye from the image buffer 23. Therefore, the combination processing units 32 and 34 are considered to alternately acquire the image data.

The combination processing units 32 and 34 acquire the OSD image data 12A through the buffer control unit 29, arrange the OSD image data 12A in a position designated by the position determining unit 35 in the image data acquired from the image buffer 23, and combine the OSD image data 12A with the image data. Image data obtained by the combination by the combination processing unit 32 and image data obtained by the combination by the combination processing unit 34 are alternately output. Therefore, as the display image data S8, the image data of the frame for the left eye and the image data of the frame for the right eye are alternately output. Since the optical-modulation-device driving unit 17 drives the optical modulation device 42 on the basis of the display image data S8, as in the example explained in the first embodiment, the projector 1 can superimpose an OSD image on a stereoscopic image and displays a combined image of the OSD image and the stereoscopic image on the screen SC.

In the configuration example shown in FIG. 8, the two combination processing units 32 and 34 apply, to the input image data 51, which is the frame-sequential stereoscopic image data, processing for combining the OSD image data 12A with the input image data S1. Therefore, processing for rendering and expanding image data in a frame memory and rendering and expanding the OSD image data 12A to be superimposed on the image data is not a bottleneck.

Therefore, even when double speed driving, quadruple speed driving, or the like for increasing a vertical synchronization frequency is performed, it is possible to combine the OSD image data 12A with all frames and display a high-quality image on the screen SC.

Further, in the configuration shown in FIG. 8, it is also possible to execute the operation explained in the first embodiment using only one of the combination processing units 32 and 34. In this case, for example, like the combination processing unit 31 (FIG. 2), the combination processing unit 32 performs processing for combining the OSD image data 12A with image data of all frames stored in the image buffer 23. In this case, the position determining unit 35 continuously outputs, to the combination processing unit 32, information for designating, on the basis of information read-out from the registers 36 and 37, a position where the OSD image data 12A is arranged.

When it is necessary to execute, at particularly high speed, the processing for combining the OSD image data 12A with the image data, for example, when the projector 1 performs the double speed driving or the quadruple speed driving, it is possible to respectively process the image data of the frame for the left eye and the image data of the frame for the right eye separately as explained above using both the combination processing units 32 and 34.

Further, an operation mode for combining the OSD image data 12A with the image data using only one of the combination processing units 32 and 34 and an operation mode for combining the OSD image data 12A with the image data using both the combination processing units 32 and 34 may be switched according to the control by the control unit 10. In this case, the control unit 10 may switch the operation modes according to whether it is necessary to execute, at particularly high speed, the processing for combining the OSD image data 12A with the image data, for example, when the projector 1 performs the double speed driving or the quadruple speed driving. Further, the control unit 10 may determine, according to the size of the OSD image data 12A or the resolution of the input image data S1, whether a load of the processing for combining the OSD image data 12A with the image data is large and switch the operation modes according to a result of the determination.

The embodiments explained above are only examples of a specific mode to which the invention is applied and do not limit the invention. The invention can also be applied as a mode different from the embodiments. In the examples explained in the embodiments, the optical modulation device 42 included in the display unit 40 is configured by the system employing three transmissive or reflective liquid crystal light valves corresponding to the respective colors of R, G, and B as modulating means for modulating light emitted by the light source. However, the invention is not limited to this configuration. For example, the optical modulation device 42 may be configured by, for example, a system in which one liquid crystal panel and a color wheel are combined, a system in which three digital mirror devices (DMDs) are used, or a DMD system in which one digital mirror device and a color wheel are combined. When only one liquid crystal panel or DMD is used as the modulating means, a member equivalent to a combination optical system such as a cross dichroic prism is unnecessary. Beside the liquid crystal panel and the DMD, a component capable of modulating the light emitted by the light source can be adopted without a problem.

In the examples explained in the embodiments, the input image data S1 is the frame-sequential or side-by-side stereoscopic image. However, the invention is not limited to this. The invention can be applied as well when, for example, line-alternative or top-and-bottom stereoscopic image data is input as the input image data S1.

The display device according to the invention is not limited to the projector that projects a video on the screen SC. Various display devices such as a liquid crystal monitor and a liquid crystal television that display an image and a video on a liquid crystal display panel and self-emitting display devices such as a monitor device and a television receiver that display an image and a video on a PDP (plasma display panel) and a monitor device and a television receiver that display an image and a video on organic EL display panels called OLED (Organic light-emitting diode) and OEL (Organic Electro-Luminescence) are also included in the image display device according to the invention. In this case, the liquid crystal display panel, the plasma display panel, and the organic EL display panel are equivalent to the display means.

The functional units of the projector 1 shown in FIGS. 1, 2, and 6 to 8 indicate functional components of the projector 1. Specific embodiments are not specifically limited. That is, hardware individually corresponding to the functional units does not always have to be mounted. It is naturally possible to adopt a configuration in which one processor executes a computer program to thereby realize functions of a plurality of functional units. A part of the functions realized by software in the embodiments may be realized by hardware. Alternatively, a part of the functions realized by hardware may be realized by software. Besides, a specific detailed configuration of the projector 1 can be arbitrarily changed without departing from the spirit of the invention.

The entire disclosure of Japanese Patent Application No. 2012-122798, filed May 30, 2012 is expressly incorporated by reference herein.

What is claimed is:

1. A display device that displays, on the basis of input image data, a stereoscopic image including an image for a left eye and an image for a right eye, the display device comprising:
    an image output unit configured to output image data of the image for the left eye and image data of the image for the right eye on the basis of the input image data;
    a buffer configured to temporarily store the image data output by the image output unit;
    a memory configured to store different image data, which is image data different from the input image data;
    an image processing unit configured to read out the different image data stored in the memory, apply, to the image data of the image for the left eye in the image data stored in the buffer, processing for arranging the different image data in a position for the left eye and combining the different image data with the image data of the image for the left eye, and apply, to the image data of the image for the right eye in the image data stored in the buffer, processing for arranging the different image data in a position for the right eye and combining the different image data with the image data of the image for the right eye; and
    a display unit configured to display an image on the basis of image data for the left eye and image data for the right eye processed by the image processing unit, wherein:
        the image output unit alternately outputs the image data of the image for the left eye and the image data of the image for the right eye to the buffer,
        the image output unit, in synchronization with the output image data, outputs a vertical synchronization signal and an identification signal to the image processing unit, the identification signal indicates whether the image data being output is the data of the image for the left eye or the data of the image for the right eye, and the image processing unit includes a position determining unit to determine the position for the left eye and the position for the right eye on the basis of the identification signal.

2. The display device according to claim 1, wherein:
the image processing unit includes:
- a register having retained therein information concerning the position of the different image data in the image data of the image for the left eye and information concerning the position of the different image data in the image data of the image for the right eye; and
- a combination processing unit configured to apply, to the image data stored in the buffer, processing for arranging the different image data in the position determined by the position determining unit and combining the different image data with the image data, and the position determining unit is configured to read out the information concerning the positions of the different image data retained in the register and determine positions where the different image data is arranged in the image data stored in the buffer.

3. The display device according to claim 2, wherein:
the image processing unit includes:
- a first register that retains information concerning the position of the different image data arranged in the image data of the image for the left eye; and
- a second register that retains information concerning the position of the different image data arranged in the image data of the image for the right eye, and the position determining unit switches, on the basis of the identification signal, the register from which the information concerning the position of the different image data is read out.

4. The display device according to claim 3, wherein the image output unit generates the image data of the image for the left eye and the image data of the image for the right eye and alternately outputs the image data on the basis of a frame-sequential, line alternative, or side-by-side image data of a stereoscopic image and generates and outputs the identification signal indicating whether the image data being output is the data of the image for the left eye or the data of the image for the right eye.

5. A control method for a display device that displays a stereoscopic image including an image for a left eye and an image for a right eye, the control method comprising:

alternately outputting image data of the image for the left eye and image data of the image for the right eye to a buffer on the basis of input image data;

outputting a vertical synchronization signal and an identification signal in synchronization with the output image data, the identification signal indicating whether the image data being output is the data of the image for the left eye or the data of the image for the right eye;

temporarily storing the image data of the image for the left eye and image data of the image for the right eye in the buffer;

reading out different image data, which is image data different from the input image data, from a memory in which the different image data is stored;

determining a position for the left eye and a position for the right eye on the basis of the identification signal;

applying, to the image data of the image for the left eye stored in the buffer, processing for arranging the different image data in the position for the left eye and combining the different image data with the image data of the image for the left eye, and applying, to the image data of the image for the right eye stored in the buffer, processing for arranging the different image data in the position for the right eye and combining the different image data with the image data of the image for the right eye; and displaying an image on the basis of processed image data for the left eye and processed image data for the right eye.

* * * * *